3,543,459
METHOD AND MEANS FOR STABILIZING CONCRETE SLAB STRUCTURES
George C. Mills, 2715 Regent St.,
Shreveport, La. 71109
Filed Sept. 5, 1968, Ser. No. 757,570
Int. Cl. E02d 27/32, 27/52
U.S. Cl. 52—169                                      10 Claims

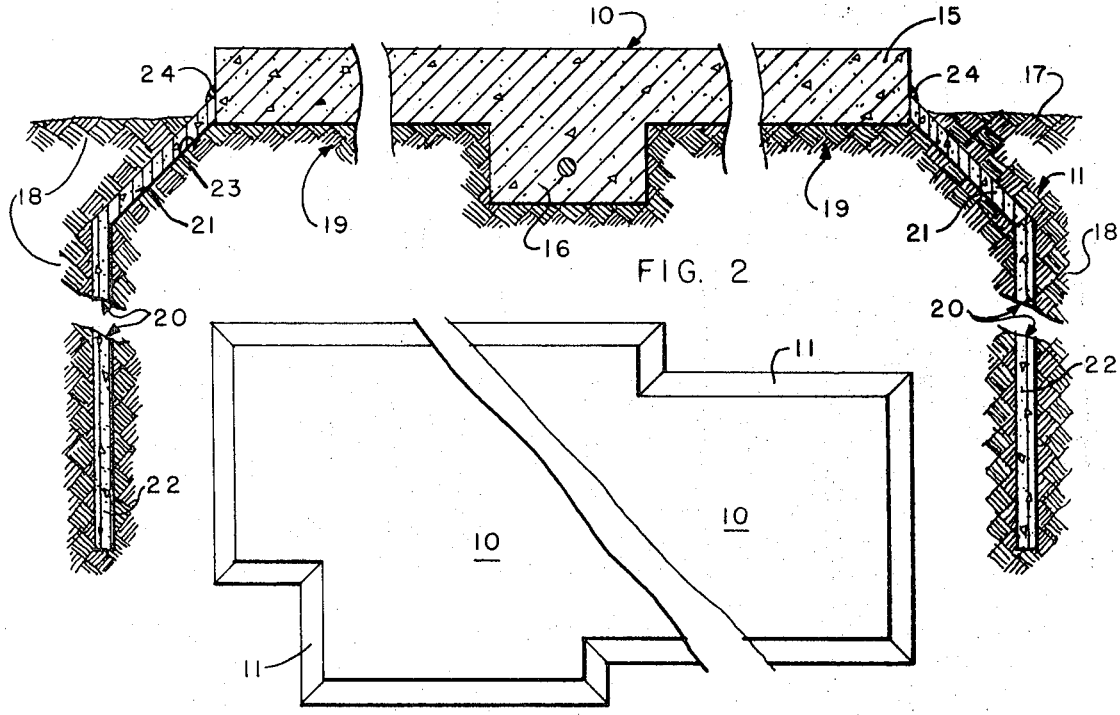
FIG. 2
FIG. 1
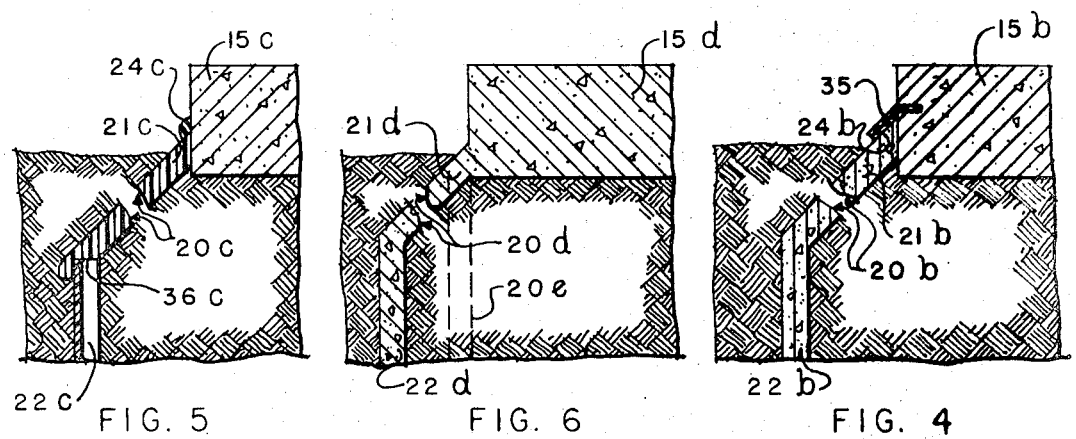
FIG. 5   FIG. 6   FIG. 4
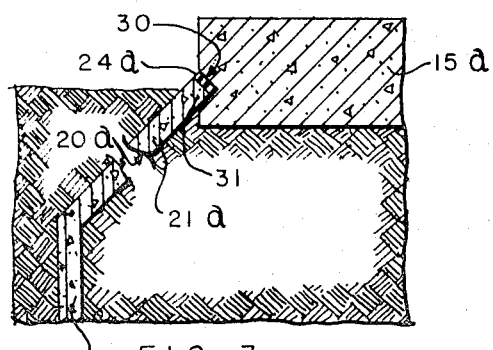
FIG. 3
INVENTOR
GEORGE C. MILLS
BY
ATTORNEY United States Patent Office  3,543,459
Patented Dec. 1, 1970

ABSTRACT OF THE DISCLOSURE

A method and means for treating slab foundations or structures to prevent cracking as a result of drying or moisture accumulation in clay soil on which the structures are constructed, comprising installing a circumferential or peripheral damming skirt normally spaced outwardly at or just beyond the peripheral limits of the structure and extending downwardly into the earth below the surface moisture level and root level of vegetation adjacent the structure.

---

This invention relates to new and useful improvements in methods and means for treating concrete slab foundations or other structures constructed on clay soil to prevent cracking of such concrete structures.

An important object of the invention is to provide a method for treating concrete structures constructed on clay soil by providing a peripheral or circumferential skirt or damming means extending downwardly below the surface of the soil a predetermined depth and normally spaced outwardly slightly from the peripheral edge of the structure to prevent exchange of moisture between that under the slab and that exteriorly thereof.

An important object of the invention is to provide a damming skirt structure circumferentially surrounding a concrete building structure on clay soil which normally is spaced outwardly from and extends downwardly below such structure to a point below the normal surface water level and below the root level of adjacent vegetation, to prevent capillary action within the soil beneath the structure.

A further object of the invention is to provide a structure of the character described in which the skirt structure or damming device structure is applicable to concrete structures already constructed on clay soil for preventing damage by such moisture exchange.

A still further object of the invention is to provide a method and apparatus for preventing exchange of moisture from beneath a concrete slab or structure and the area of the earth beyond the perimeter of the slab or structure to maintain a substantially uniform moisture level beneath the entire slab or concrete structure.

Another object of the invention is to provide a method of erecting a damming skirt around the periphery of a concrete structure to prevent transfer of fluids or moisture in the soil beneath the structure by siphoning or capillary withdrawal or other action of the vegetation in the soil beneath the structure, by preventing lateral flow of such moisture.

A further object of the invention is to provide a structure for use with a previously constructed concrete structure disposed on a clay soil to prevent transfer of fluid from within the perimeter and beneath the concrete structure to the soil laterally outwardly beyond the perimeter of such structure.

Additional objects and advantages of the invention will be readily apparent from the reading of the following description of the method and of the structures constructed in accordance with the invention, and reference to the accompanying drawings illustrating the same, wherein:

FIG. 1 is a schematic plan view of a concrete structure illustrating the damming skirt structure disposed around the periphery thereof;

FIG. 2 is an enlarged vertical sectional view through a concrete structure or slab having a damming skirt disposed around the periphery or perimeter of the structure;

FIG. 3 is a fragmentary vertical sectional view of one edge of a concrete structure showing a modified form of damming skirt structure;

FIG. 4 is a view similar to FIG. 3 showing a further modification of a damming skirt;

FIG. 5 is a vertical sectional view of still another modification of concrete structure showing a damming skirt that is connected therewith; and, FIG. 6 is a fragmentary vertical sectional view of a concrete structure having a monolithic damming skirt constructed as a part thereof.

In the drawings, the numeral 10 designates schematically an irregularly shaped concrete structure having a number of angular peripheral sections and provided with a damming skirt 11 erected adjacent the periphery of the structure 10 and encircling the same.

In FIG. 2, a concrete slab structure 15 having a central beam 16 is shown erected on a ground surface 17 which is usually of clay or other soil which is expandible and contractible due to moisture change and provides for a ready transfer of moisture from the soil 18 laterally exterior to the soil 19 underlying the confines of the concrete slab. A damming structure or protective skirt 20 is shown to have been constructed adjacent the peripheral edge portions of the concrete slab structure and has a downwardly and outwardly extending upper arm 21 and a vertically extending body portion 22 which may extend into the earth to a predetermined depth. The damming skirt 20 extends completely around the concrete slab structure in the manner illustrated schematically at 11 in FIG. 1, and forms a unitary damming structure preferably spaced slightly outwardly from the peripheral edge of the slab 15. The vertical portion of the body 22 of the damming structure extends downwardly to a predetermined depth in the soil sufficient to extend below the natural normal surface water level and below the root level of vegetation adjacent the concrete slab structure.

To install the skirt damming structure a vertical trench is dug in the earth and, if desired, forms (not shown) installed within the trench to contain the latter poured concrete damming skirt 20, which may be of concrete or other suitable material. If desired, it is obvious that the trench into which the vertical body portion 22 of the damming skirt is poured may be of the exact width of the damming skirt or lateral thickness of the damming skirt so that no form is required for that portion of the skirt. The downwardly and outwardly inclined arm portion would then be poured on an angularly formed earth portion 23 of the trench and the concrete formed by troweling or otherwise to the desired thickness above the earth. The concrete skirt or damming structure is preferably about two to six inches in thickness, and the upper end of the arm portion extends to the peripheral edge portion of the concrete slab and is grouted or sealed as at 24 to the slab by means of tar, plastic sealant, or any other suitable material for sealing the junction of the skirt with the perimeter of the slab. The edge of the slab is usually cleaned with muriatic acid or other cleaning compound to assure a clean concrete joint when the skirt is poured so that the upper edge portion of the arm will seal with the concrete naturally. The seal 24 is then applied above the joint to prevent water or other moisture from entering between the slab and the skirt structure. It is also readily apparent that the skirt may be lightly reinforced with mesh wire or the like (not shown), if desired, although such reinforcement is not essential, since the skirt or dam is not under load stresses.

After the upper portion of the skirt has been formed the earth is filled in over the upper end of the vertical body portion 22 and the angularly disposed arm 21 of the skirt, and graded to a point adjacent the slab, preferably leaving the upper portion of the skirt slightly exposed.

It will be apparent from the foregoing that it is preferable that the trench be dug from six to twenty-four inches laterally offset from the perimeter of the slab, if the slab has been previously constructed on the soil to permit use of trenching machines and prevent damage to the slab. The trench is also dug to a depth of approximately four feet or more, depending upon the soil moisture conditions and the depth of the tree roots or other vegetation surrounding the structure. The vertical depth must be sufficient to prevent lateral transfer of surface moisture from the soil laterally exteriorly of the slab to the area beneath the slab, and to prevent roots from entering under the slab and causing siphoning action or capillary withdrawal of moisture from under the perimeter of the slab by means of the roots.

It will readily be apparent that the skirt or dam thus maintains a uniform moisture level beneath the slab or other concrete structure, and prevents transfer of moisture from the peripheral or perimeteral edge portions of the slab so that the moisture level under the slab is uniform and will not vary to cause expansion and contraction of the clay soil to produce cracks which normally result from such variations in the moisture level under such structure. Withdrawal of moisture by surface vegetation, evaporation or the like, is thus prevented, and the uniform moisture level is maintained relatively constant beneath the slab.

In FIG. 3, a modified form of a skirt 20a is shown wherein the concrete slab 5a is provided with an angularly formed substantially V-shaped peripheral or perimeteral groove 30 at the time the slab is poured or formed. This is done by providing a suitable form structure on the vertical forms for the slab edge and the peripheral edge of the slab is there formed with the V-shaped perimetral grooves 30 when the forms are removed after the slab has hardened or cured.

The depending circumferential damming skirt 20a is formed in the manner already described in connection with FIG. 2, except that the upper end 31 of the angularly extending arm 21a is formed to extend into the V-shaped groove 30 in the peripheral edge portion of the slab as clearly shown in the drawing. A suitable grout or sealant 24a may be inserted in the groove or recessed between the upper end of the angularly disposed arm 21a and the upper inwardly inclined surface of the groove in the slab to prevent moisture entering therebetween in the manner already described. This structure provides a slight variation in the method of forming the slab and the damming skirt, but functions like the form previously described.

Similarly, in FIG. 4 a metal or plastic strip 35 has one edge portion disposed in the concrete at the time of pouring the concrete slab 15b with its other edge portion extending outwardly therefrom. After the damming skirt 20b has been formed adjacent the peripheral edge of the slab, the projecting portion of the strip is bent downwardly to overlie the upper edge portion of the damming skirt and may be sealed thereto at 24b by tar, plastic sealant, or other suitable material to prevent moisture entering between the damming skirt and the slab.

A further modification of the damming skirt is shown in FIG. 5 wherein the vertical body portion 22c of the damming skirt 20c is formed of a corrugated sheet which may be asbestos reinforced concrete or fiberglass plastic material, and is disposed in the trench dug around the peripheral edge of the concrete slab, and angularly disposed downwardly and outwardly extending arm portion 21c of plastic, concrete, tar or similar sealing material is disposed in the trench abutting the edge portion of the concrete slab 15c and extending downwardly and outwardly and engaging or encompassing the upper edge portion of the corrugated sheet or body portion of the skirt. If the arm portion of the skirt is formed of plastic, a suitable adhesive 36c may be applied to the upper end of the corrugated or other suitable panel forming the body portion of the skirt to obtain a tight seal to prevent moisture transfer and to prevent root growth therebetween. A suitable sealant 24c may be provided between the upper end of the angular arm portion and the peripheral edge of the slab in the manner already described.

In FIG. 6, a monolithic slab and damming skirt structure is illustrated. The damming skirt 20d is poured into a vertical trench and the lateral angular upper arm 21d in the sloping portion of the trench adjacent the peripheral edge portions of the slab 15d at the same time or previously to pouring of the slab so that a monolithic slab structure and skirt is obtained as shown. It is believed obvious that the skirt may extend vertically downwardly at the outer peripheral edge of the slab, as shown in dotted lines at 20e, if desired.

In all cases the slab structure and the damming skirt may be formed of concrete reinforced by metal mesh or similar material. Or, if desired, the material may be some other suitable material such as reinforced concrete asbestos panels which may be corrugated or planar, plastic panels which may be corrugated or planar, or the like. The angular portion of the damming skirt may be formed integral with the plastic panels, if desired. Or, the angular portion may be formed of plastic, tar or other suitable sealing material deposited in a trench and sealing with the upper edge portion of the panels and with the peripheral edge portion of the concrete slab as has already been described.

The structures may vary so long as the method is carried out substantially as described.

The foregoing description of the invention is explanatory only, and changes in the details of the constructions illustrated and the methods described may be made by those skilled in the art, within the scope of the appended claims, without departing from the spirit of the invention.

What is claimed and desired to be secured by Letters Patent:

1. Means for stabilizing a concrete structural slab located on a shifting soil base including: an imperforate damming member extending downwardly into the earth contiguous to and surrounding the periphery of said concrete slab; said damming member having a vertical extent great enough to dispose the lower edge thereof below the normal surface water level of said soil base and below the root level of adjacent vegetation for preventing transfer of surface water between the soil beneath the peripheral edge portions of the slab and the surface soils peripherally outwardly of said slab, and for preventing water transfer by the roots of the adjacent vegetation; and means sealing between the upper end of said damming member and the peripheral edge of the concrete slab to prevent water transfer therebetween; said damming member and sealing means maintaining a substantially uniform soil moisture spread beneath said slab.

2. Means of the character set forth in claim 1 wherein said damming member includes a laterally downwardly and outwardly projecting upper end portion and a vertically downwardly extending body portion.

3. Means of the character set forth in claim 1 wherein said sealing means includes a member integral with said slab and seated to the upper peripheral edge of said damming member.

4. A structure of the character set forth in claim 1 wherein the slab is provided with an angular groove formed in and extending peripherally around the edge of the entire slab, and the upper end portion of the damming member is disposed and sealed in said groove.

5. A structure of the character set forth in claim 2 wherein the body portion of the damming member is of corrugated material and the inclined upper end portion is a plastic sealing means joining the upper end of the corrugated member with the peripheral edge of the slab.

6. In combination, a concrete slab structure on a soil base expansible and contractible by changes in moisture content thereof to a degree sufficient to shift the peripheral edge portions of the slab with respect to the inner portion thereof, and a continuous peripheral damming member extending downwardly at a point outwardly of and adjacent the periphery of the slab structure to a point in the soil below the root level of adjacent vegetation and below the normal surface water level of the soil on which the structure is disposed, said damming member being formed integral with said slab into a monolithic structure and precluding transfer of moisture from beneath the edge portions of such slab by changes in atmospheric conditions or capillary action of the vegetation roots and maintaining a substantially uniform soil moisture spread beneath said slab.

7. A method of stabilizing a concrete slab structure on a soil base expansible and contractible by changes in moisture content thereof to a degree sufficient to shift the edge portions of said slab with respect to the central portion thereof sufficiently to damage the slab, said method comprising: providing a trench surrounding the periphery of the slab structure and adjacent the peripheral edge thereof and extending downwardly into the soil base to a depth below the normal surface water level and root level of adjacent vegetation; forming a continuous peripheral damming member in said trench extending from the bottom thereof to a point adjacent and in contact with the edge periphery of said slab structure; and forming a seal between the upper end of the damming member and the slab structure around the entire periphery of the slab structure; and precluding by means of said damming member and seal moisture transfer between the soil base beneath the slab within the damming member and the soil peripherally outwardly of the damming member by atmospheric conditions or capillary action of vegetation roots to maintain a substantially uniform moisture content spread in the soil beneath said slab.

8. A method as set forth in claim 7 wherein a sealing member is formed in the slab and is sealed to the damming member after the damming member has been formed.

9. A method of stabilizing a concrete slab structure of the character set forth in claim 7 wherein the damming member and the slab structure are formed integral in a monolithic structure.

10. A method as set forth in claim 7 wherein a main body portion the damming member is spaced laterally outwardly of and extending continuously around the entire periphery of the slab structure, and an upper inwardly extending portion connects said main body portion with the seal.

References Cited

UNITED STATES PATENTS

| 718,441 | 1/1903 | Ewen | 52—169 |
|---|---|---|---|
| 3,184,893 | 5/1965 | Booth | 52—742 |

OTHER REFERENCES

D. P. Krynine, Soil Mechanics, McGraw-Hill Book Co., Inc., New York, 1947, 2nd edition, pp. 72 and 73, Sci. Lib.

HENRY C. SUTHERLAND, Primary Examiner

J. L. RIDGILL, Jr., Assistant Examiner

U.S. Cl. X.R.

52—294, 742; 61—.5